United States Patent [19]
Landis et al.

[11] Patent Number: 5,435,273
[45] Date of Patent: Jul. 25, 1995

[54] ANIMAL LEASH

[76] Inventors: George Landis; Dana Landis, both of 6097 W. Garfield, Salem, Ohio 44460

[21] Appl. No.: 241,793

[22] Filed: May 9, 1994

[51] Int. Cl.$^6$ .............................................. A01K 27/00
[52] U.S. Cl. ........................................ 119/795; 2/160
[58] Field of Search ............... 119/770, 792, 793, 795, 119/797; 2/160

[56] References Cited

U.S. PATENT DOCUMENTS

| | | | |
|---|---|---|---|
| 1,924,596 | 8/1933 | Davis | 119/798 |
| 2,275,701 | 3/1942 | Taylor | 119/798 |
| 2,737,154 | 3/1956 | Michonski | 119/798 |
| 3,603,295 | 9/1971 | Shuman | 119/795 |
| 4,447,912 | 5/1984 | Morrow | 2/160 X |
| 4,863,084 | 9/1989 | Nabozny | 224/253 |
| 4,905,321 | 3/1990 | Walunga | 2/160 X |
| 5,226,190 | 7/1993 | Lynch | 2/160 X |

Primary Examiner—Robert P. Swiatek
Attorney, Agent, or Firm—Harpman & Harpman

[57] ABSTRACT

A self-contained animal leash to securely hold a large dog or other animal on a lead comprising a glove which is worn by the user having a support and attachment leash element integral with the glove and optionally removably secured to a single point of attachment with the glove.

10 Claims, 3 Drawing Sheets

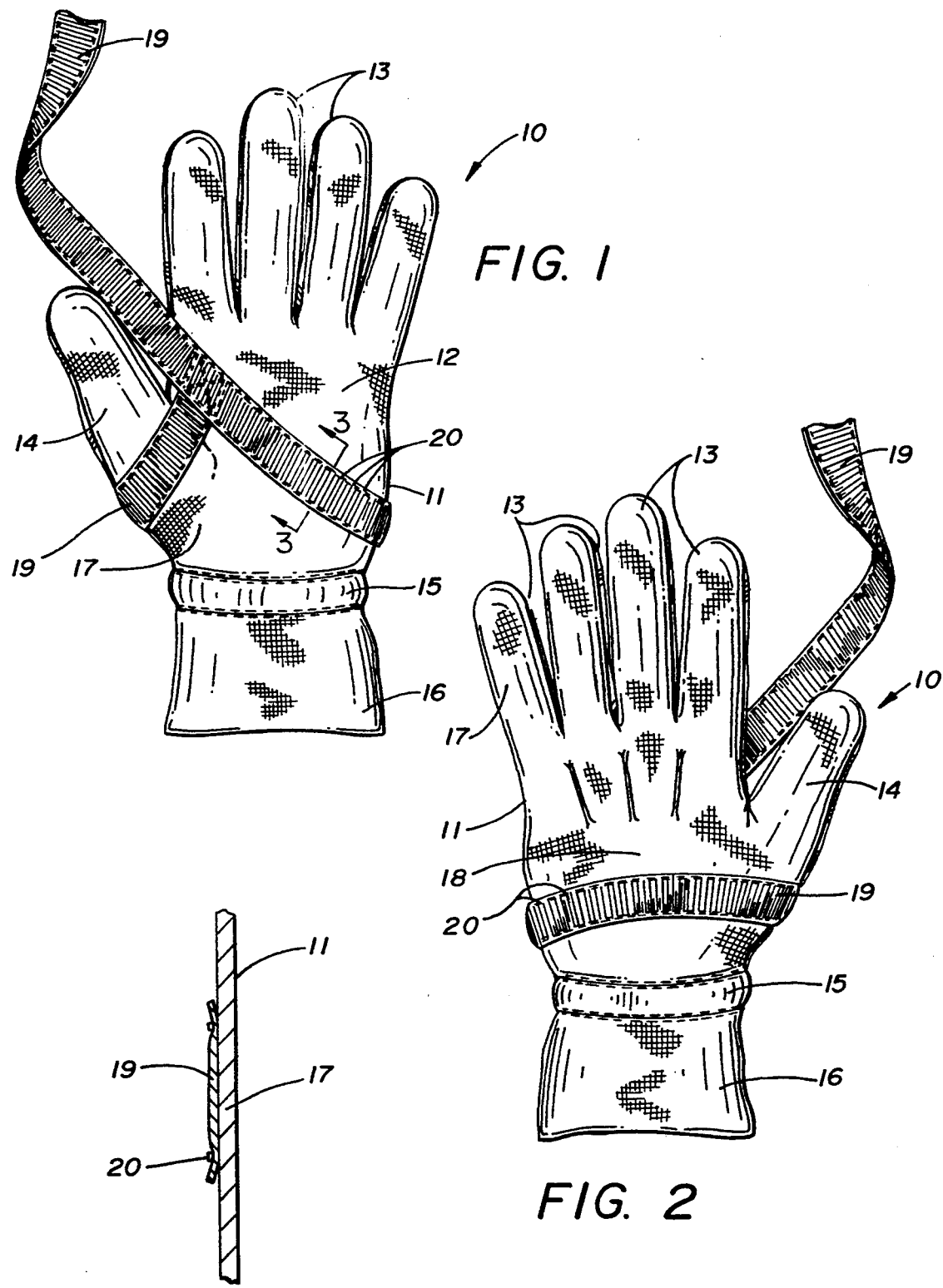

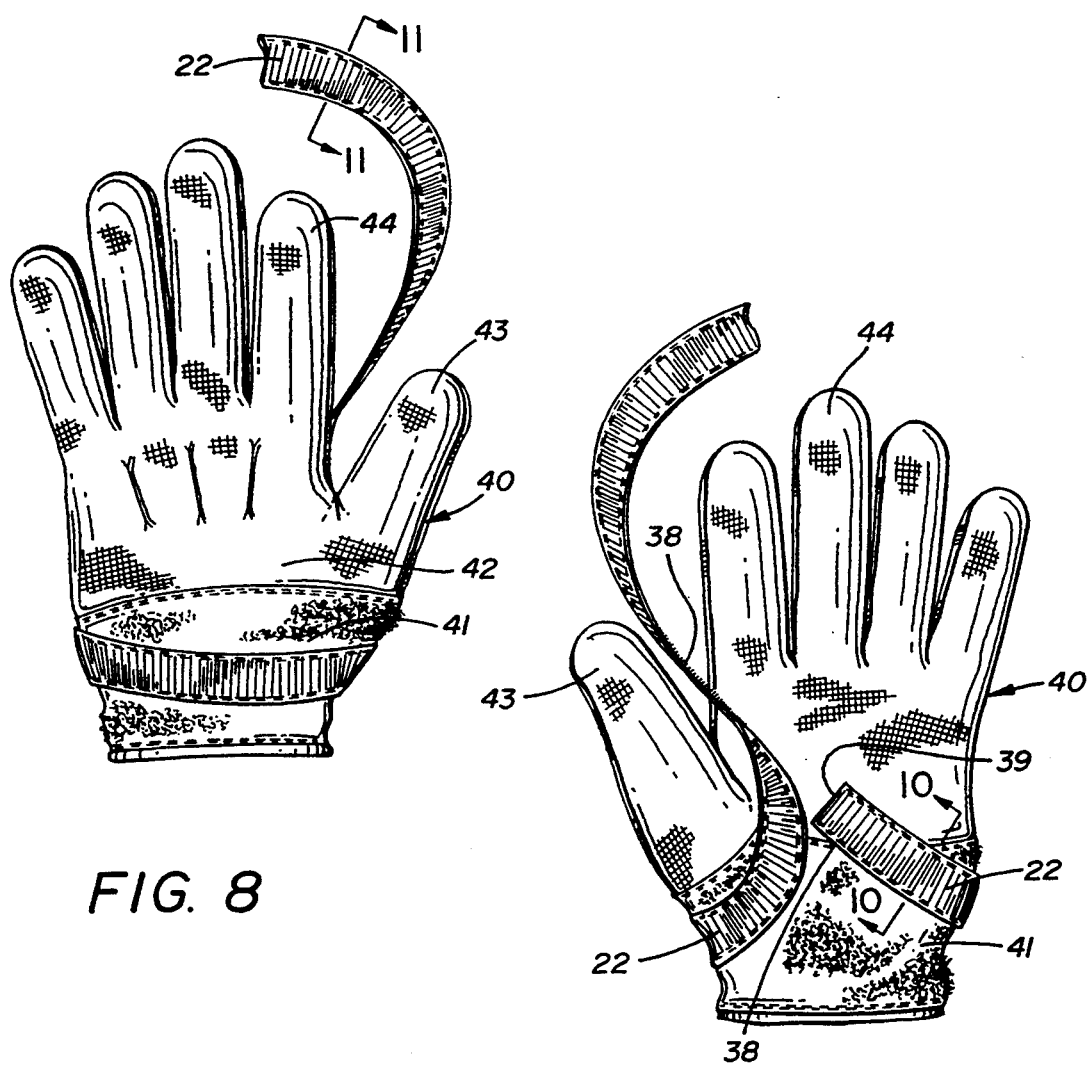
FIG. 8
FIG. 9
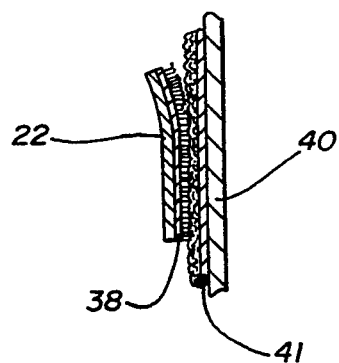
FIG. 10
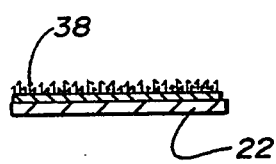
FIG. 11

ANIMAL LEASH

BACKGROUND OF THE INVENTION

1. Technical Field

This device relates to animal leashes and leads used to walk an animal by a human using an elongated flexible element with a hand grip on one hand and a releasable snap hook on the opposite end engaging the animal's collar or the like.

2. Description of Prior Art

Prior art devices of this type have relied on a variety of different leash configurations using yielding and non-yielding fabrics, ropes and chain leads having handles and straps on one end and releasable clasps on the other end to secure the animal thereto, see for example U.S. Pat. Nos. 1,924,596, 2,275,701, 2,737,154, 3,603,295 and glove configuration utilizing gloves with reinforcing elements, see U.S. Pat. No. 4,863,084.

In U.S. Pat. No. 1,924,596 a dog leash is disclosed having an elongated lead with a handle loop formed on one end and a releasable link on the other.

U.S. Pat. No. 2,275,701 is directed to a dog leash wherein an elastic lead is provided as an interconnective element between a hinge strap and a leash strap onto which the dog is secured by a snap fastener.

U.S. Pat. No. 2,737,154 discloses an expansible dog leash utilizing a handle loop formed on one end and a resilient expansible cord formed on a lead to a snap fastener attached to the animal.

Referring to U.S. Pat. No. 3,603,295 an animal leash is illustrated wherein a leash is formed by defining a slip collar on one end for the animal and a handle loop encircling the wrist of the user on the other end. The handle loop terminates with a grip registerable within an opening in the end of the leash.

U.S. Pat. No. 4,863,084 discloses a hip leash glove defining a portable disposable glove dispensing system that releasably secures a glove to a holding strap worn by the end user. The glove is removed from the holder by imparting pulling pressure thereon.

Applicant's device is a combined glove and leash configuration to provide a secure comfortable grip of the leash used to walk dogs or other animals.

SUMMARY OF THE INVENTION

The present invention is an improvement to animal leashes that are used to walk and control animals attached thereto such as dogs or the like. The improvement is directed to combining a leash with a hand encompassing glove so as to provide an integral handle for the leash that allows the user's full gripping potential to be utilized. The leash is integral about the glove with the leash extending from the glove in an area between the user's index finger and opposing thumb.

DESCRIPTION OF THE DRAWINGS

FIG. 1 is a side elevational view of the animal leash;

FIG. 2 is an opposite side elevational view of the animal leash;

FIG. 3 is an enlarged fragmented cross-sectional view on lines 3—3 of FIG. 1;

FIG. 8 is a side elevational view of a third alternate form of the animal leash;

FIG. 9 is an opposite side elevational view of the leash shown in FIG. 8;

FIG. 10 is an enlarged fragmentary cross-sectional view on lines 10—10 of FIG. 9; and FIG. 11 is an enlarged fragmentary cross-sectional view on lines 11—11 of FIG. 8,

DESCRIPTION OF THE PREFERRED EMBODIMENT

Figure 4:
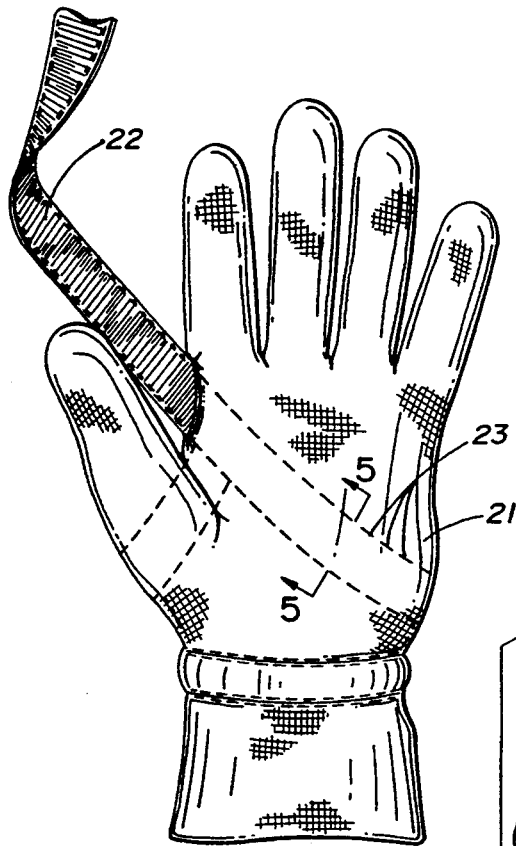
FIG. 4 is a side elevational view of an alternate form of the invention.

Referring to FIGS. 1-3 of the drawings, an animal leash 10 can be seen comprising a glove 11 having a palm portion 12 with an interconnected finger portion 13 and opposing thumb portion 14. An elastic strap 15 is secured within the glove 11 between the palm portion 12 and a wrist sleeve 16. The glove 11 is constructed in accordance with traditional sewing techniques that typically employ cutting a two-part glove pattern from fabric or leather material. The two-part glove pattern of the chosen material defines a front side 17 and a back side 18 which includes the hereinbefore disclosed palm, finger and thumb portions 12, 13 and 14.

In the glove 11 chosen for illustration, an addition of the wrist sleeve 16 is sewn onto the respective front and back side 17 and 18 of the two-part glove portion once same has been sewn together as illustrated in FIGS. 1 and 2 of the drawings.

A leash element 19 comprising an elongated strip of woven synthetic material well known for its durability and strength is permanently secured to the glove by sewing at 20. The leash element 19 is secured onto the glove 11 extending around the opposing thumb portion 14, across the back side 18 of the glove portion and continuing around and across the front side 17 of the palm portion 12 adjacent itself about the thumb portion 14. The leash element 19 extends beyond and away from the glove between the opposing thumb portion 14 and respective finger portion 13 as best seen in FIG. 1 of the drawings.

The leash 19 positioned on the glove 11 provides for maximum contact therebetween with the most natural gripping configuration associated with leashes in that the leash 19 extends from the glove from between the thumb portion 14 and the base of the opposing finger of the finger portion 13.

Figure 5:
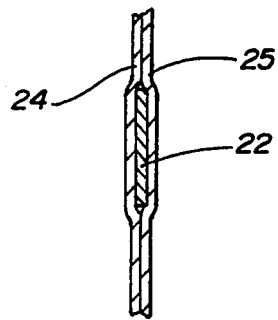
FIG. 5 is an enlarged fragmentary cross-sectional view on lines 5—5 of FIG. 4.
Figure 6:
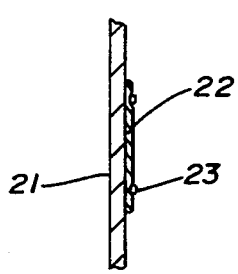
FIG. 6 is an enlarged fragmented cross-sectional view of an alternate form of lead attachment.

Referring to FIGS. 4, 5 and 6 of the drawings, alternate leash lead attachment configurations are shown wherein FIG. 4 illustrates an alternate glove 21 having a leash 22 secured by sewing at 23 within the glove 21 as seen in FIG. 6.

A third alternate leash attachment configuration is illustrated in FIG. 5 of the drawings wherein the leash 22 is secured between multiple material layers 24 and 25 by sewing which in this alternate configuration is used to form the equivalent of respective front side and back side 17 and 18 of the glove as hereinbefore described.

In the above alternate configurations, the leash path about the glove 21 and attachment method remains the same as described in the preferred glove 11 construction.

Figure 7:
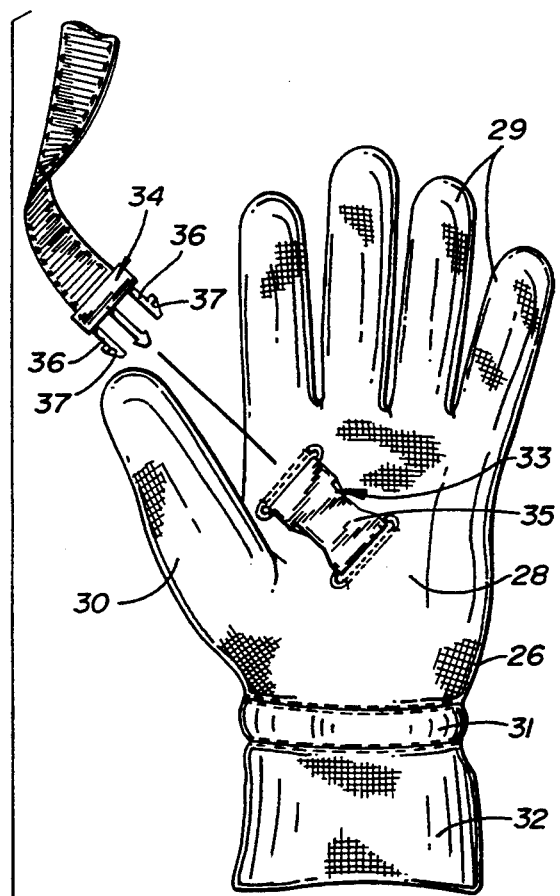
FIG. 7 is a side elevational view of a second alternate form of the animal leash invention.

Referring now to FIG. 7 of the drawings, a fourth alternate leash configuration is illustrated having a glove 26 with a palm portion 28 and interconnected finger and opposing thumb portions 29 and 30 respectively. An elastic strap 31 is integral with a sleeve 32 extending therefrom.

A male/female clasp 33 is secured to the palm portion 28 of the glove 26. A male clasp portion 34 is illustrated in unsecured aligned spaced relation to a female clasp portion 35 on the glove 26 as hereinbefore described. The male clasp portion 34 has multiple resilient tines 36 extending therefrom for interlocking engagement with the aligned female clasp portion 35 as will be well understood by those skilled in the art. Once so engaged, the male clasp portion 34.has locking elements 37 extending therefrom on the ends of the respective tines 36.

To release the male clasp portion 34 and interconnected leash element the locking element 37 on the respective tines 35 are depressed is well known for release.

A fifth alternate leash attachment configuration is illustrated in FIGS. 8–11 of the drawings wherein the leash 22 is provided with a Velcro brand insert patch, best seen in FIGS. 10 and 11 inwardly from its free end indicated generally at 39.

A fourth alternate glove 40 is illustrated in FIGS. 8 and 9 in which a Velcro brand band 41 is secured about the lower portion of the glove 40 adjacent and extending about the palm portion 42 completely around the glove as illustrated.

The leash 22 with its Velcro brand attachment 38 of hook configurations is wrapped around the glove engaging upon the Velcro brand band 41 which is of a loop configuration so that it can be secured about the Velcro brand band 41 and extend outwardly between a thumb 43 and index finger 44 portion of the gloves.

It will be clear from the above illustration and description that this fourth alternate form defines an acceptable alternative to the earlier forms of the invention which included the sewn configuration and clasp configuration hereinbefore described.

It will thus be seen that a new and novel animal leash has been illustrated and described and that various changes and modifications may be made herein without departing from the spirit of the invention, therefore I claim:

1. An animal restraining device for sure grip control of an animal by a person as said animal is walked comprising, a glove to be worn by the person, said glove having a front side and a back side secured to one another, said front side having a palm portion, finger portion and thumb portion, said back side having a finger portion and a thumb portion, a lead secured to said glove, said lead comprising an elongated element, means for securing said lead to a portion of said glove including said palm portion of said glove and said back side, said lead extending about said glove portion defined by said respective thumb portion, said lead extending from said glove midway between said thumb portion and said finger portion.

2. The animal restraining device of claim 1 wherein said means for securing said lead to said glove comprises affixing said lead by sewing said lead to the outer surface of said glove.

3. The animal restraining device of claim 1 wherein said lead is of an elongated strip of woven synthetic material.

4. The animal restraining device of claim 1 wherein said lead is secured inside said glove portion by sewing.

5. The animal restraining device of claim 1 wherein said lead is secured within multiple layers defining said respective front side and back side interconnected to one another of said glove.

6. A modified animal restraining device for sure grip control of an animal on a lead comprising a glove to be worn by a person, said glove having a palm portion, finger portions and a thumb portion, a quick releasable clasp secured to said palm portion of said glove, said releasable clasp comprising a male clasp portion and a female clasp portion, a lead secured to said male clasp portion, said male clasp portion slideably connected within said female clasp portion.

7. The modified animal restraining device of claim 6 wherein said lead is of a woven synthetic material.

8. The modified animal restraining device of claim 6 wherein said releasable clasp and said female clasp portion and said male portion are made of rigid plastic.

9. An animal restraining device for sure grip control of an animal by a person as said animal is walked comprising, a glove to be worn by the person, said glove having a palm portion, a finger portion and a thumb portion, an area of releasable material permanently secured around said glove below said thumb and finger portion, a lead having a releasable securable portion adjacent its free end, said lead positioned around said glove over said releasable securable portion so as to be detachably secured from said glove selectively.

10. The animal restraining device for sure grip control of an animal of claim 9 wherein said releasable material on said glove comprising fabric loops and said releasably securable portion on said lead comprises interlocking fabric hooks engageable on said releasable material on said glove.

* * * * *